United States Patent
Go et al.

(10) Patent No.: US 11,988,380 B2
(45) Date of Patent: May 21, 2024

(54) INJECTION NOZZLE, COMBUSTOR INCLUDING SAME NOZZLE, AND GAS TURBINE INCLUDING SAME COMBUSTOR

(71) Applicant: DOOSAN ENERBILITY CO., LTD, Changwon (KR)

(72) Inventors: Young Gun Go, Yongin (KR); Hyun Soo An, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/561,962

(22) Filed: Dec. 26, 2021

(65) Prior Publication Data

US 2022/0243911 A1 Aug. 4, 2022

(30) Foreign Application Priority Data

Feb. 3, 2021 (KR) .......................... 10-2021-0015391

(51) Int. Cl.
| | |
|---|---|
| F23D 14/00 | (2006.01) |
| F23D 14/58 | (2006.01) |
| F23D 14/70 | (2006.01) |
| F23D 14/82 | (2006.01) |
| F23R 3/28 | (2006.01) |

(52) U.S. Cl.
CPC ............. *F23D 14/70* (2013.01); *F23D 14/58* (2013.01); *F23D 14/82* (2013.01); *F23R 3/286* (2013.01)

(58) Field of Classification Search
None
See application file for complete search history.

(56) References Cited

U.S. PATENT DOCUMENTS

| | | | |
|---|---|---|---|
| 6,360,776 B1* | 3/2002 | McCormick | F23R 3/12 60/737 |
| 2013/0104552 A1* | 5/2013 | Uhm | F23M 20/005 60/738 |
| 2015/0176841 A1* | 6/2015 | Barker | F23R 3/10 60/737 |
| 2016/0033133 A1* | 2/2016 | Johnson | F23R 3/286 60/737 |
| 2016/0033134 A1* | 2/2016 | Johnson | F23R 3/286 239/589 |
| 2017/0268780 A1* | 9/2017 | Purcell | F23R 3/283 |
| 2018/0149360 A1* | 5/2018 | Theuer | F02C 9/28 |
| 2018/0187603 A1* | 7/2018 | Berry | F23R 3/32 |
| 2019/0072279 A1* | 3/2019 | Natarajan | F23R 3/34 |

FOREIGN PATENT DOCUMENTS

KR 10-2019-0040666 A 4/2019

* cited by examiner

*Primary Examiner* — Edwin Kang
(74) *Attorney, Agent, or Firm* — Harvest IP Law, LLP

(57) ABSTRACT

An injection nozzle installed in a combustor of a gas turbine to inject fuel and compressed air into a combustion chamber is provided. The injection nozzle includes an inlet portion through which fuel and compressed air are introduced, an outlet portion disposed downstream of the inlet portion in a flow direction of fluid and configured to discharge the fuel and compressed air to the combustion chamber, and an intermediate portion connected obliquely to each of the inlet portion and the outlet portion, wherein the inlet portion and the intermediate portion are symmetrically formed based on an imaginary central line extending from the outlet portion along the flow direction of fluid and passing through a center of the outlet portion.

11 Claims, 12 Drawing Sheets

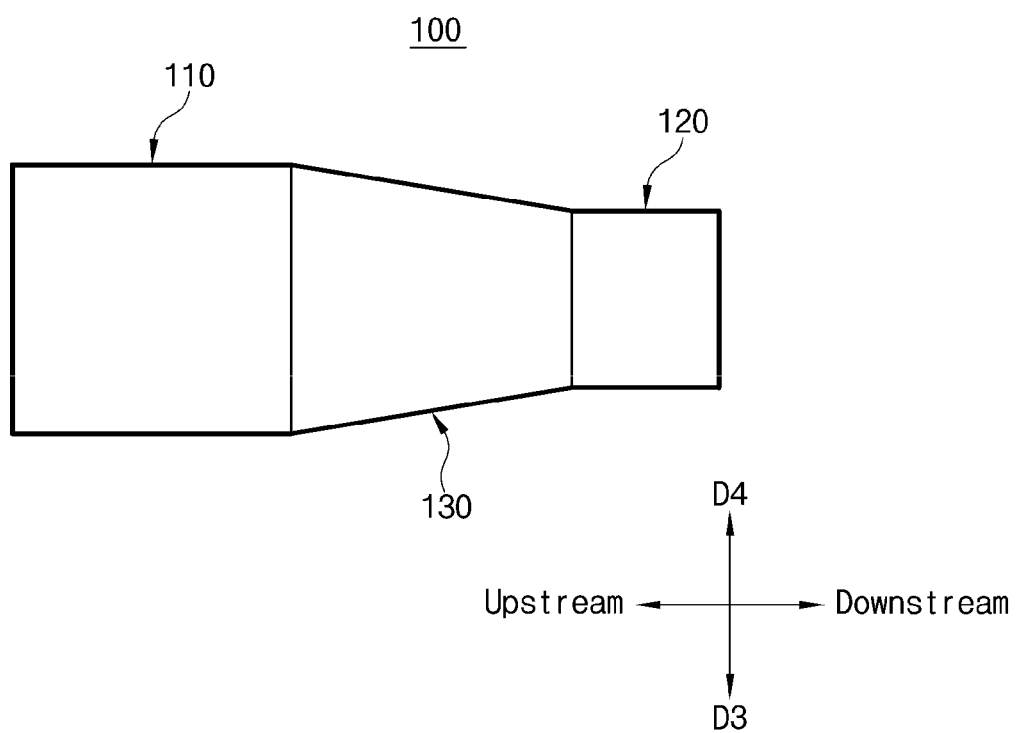

INJECTION NOZZLE, COMBUSTOR INCLUDING SAME NOZZLE, AND GAS TURBINE INCLUDING SAME COMBUSTOR

CROSS REFERENCE TO RELATED APPLICATION

This application claims priority to Korean Patent Application No. 10-2021-0015391, filed on Feb. 3, 2021, the disclosure of which is incorporated herein by this reference in its entirety.

BACKGROUND

1. Field

Apparatuses and methods consistent with exemplary embodiments relate to an injection nozzle, a combustor, and a gas turbine equipped with the same, and more particularly, to an injection nozzle provided in a combustor of a gas turbine and configured to discharge fuel and compressed air to a combustion chamber of the combustor.

2. Description of the Related Art

A turbo machine refers to a device that generates a driving force used to generate electric power with fluid (e.g., gas) passing through the turbo machine. Therefore, a turbo machine and a generator are usually used together. The turbo machine may include gas turbines, steam turbines, wind power turbines, and the like. A gas turbine mixes compressed air and natural gas and burns the mixture to generate combustion gas that is used to generate a driving force for the generation of electric power. A steam turbine heats water to generate steam that is used to generate a driving force for the generation of electric power. A wind turbine converts wind power into a driving force for the generation of electric power.

The gas turbine includes a compressor section, a combustor section, and a turbine section. The compressor section includes a plurality of compressor vanes and a plurality of compressor blades alternately arranged in a compressor casing with an air inlet through which air is introduced. The introduced air is compressed by the compressor vanes and the compressor blades while passing through an inside of the compressor section. The combustor section mixes fuel with the compressed air compressed by the compressor section. In addition, the combustor ignites the fuel-air mixture with an igniter to generate high-temperature and high-pressure combustion gas. The generated combustion gas is supplied to the turbine section. The turbine section includes a plurality of turbine vanes and a plurality of turbine blades alternately arranged in a turbine casing. The combustion gas generated by the combustor rotates the turbine blades while passing through an inside of the turbine section and then is discharged to outside through a turbine diffuser.

The steam turbine includes an evaporator and a turbine. The evaporator generates steam by heating water supplied from the outside. The turbine of the steam turbine includes a plurality of turbine vanes and a plurality of turbine blades alternately arranged in a turbine casing. While the gas turbine uses the combustion gas, the steam turbine uses the steam generated by the evaporator to rotate the turbine blades.

The combustor of the gas turbine includes a nozzle casing, a liner installed downstream of the nozzle casing and having a combustion chamber in which the fuel-air mixture is combusted, a transition piece installed downstream of the liner to supply combustion gas to the turbine section, and an injection nozzle which is installed inside the nozzle casing and discharges the fuel-air mixture to the combustion chamber.

The combustor section of a related art gas turbine is equipped with a plurality of straight tube-type injection nozzles and has a problem in that the flame generated in the combustion chamber or the radiant heat radiating from an inner wall of the combustion chamber is not blocked and is transmitted to a portion of the injection nozzle in which fuel and compressed air are mixed. For this reason, the related art gas turbine undergoes self-ignition in which the fuel-air mixture is spontaneously ignited by the radiant heat transferred to the injection nozzle or a flashback phenomenon in which the flame generated in the combustion chamber flows backward instead of proceeding to the turbine section.

SUMMARY

Aspects of one or more exemplary embodiments provide an injection nozzle capable of preventing flames or radiant heat generated by combustion of a mixture of fuel and compressed air from being transferred to an inner area in which the fuel and compressed air are mixed, a combustor including the injection nozzle, and a gas turbine including the combustor.

Additional aspects will be set forth in part in the description which follows and, in part, will become apparent from the description, or may be learned by practice of the exemplary embodiments.

According to an aspect of an exemplary embodiment, there is provided an injection nozzle for injecting fuel and compressed air to a combustion chamber of a combustor of a gas turbine, the injection nozzle including: an inlet portion through which fuel and compressed air are introduced; an outlet portion disposed downstream of the inlet portion in a flow direction of fluid and configured to discharge the fuel and compressed air to the combustion chamber; and an intermediate portion connected obliquely to each of the inlet portion and outlet portion, wherein the inlet portion and the intermediate portion are symmetrically formed based on an imaginary center line extending from the outlet portion along the flow direction of fluid and passing through a center of the outlet portion.

According to an aspect of another exemplary embodiment, there is provided a combustor including: a nozzle casing configured to receive compressed air from a compressor and to receive fuel from an outside; a liner disposed downstream of the nozzle casing in a flow direction of fluid and defining a combustion chamber in which a mixture of the fuel and the compressed air is combusted; a transition piece disposed downstream of the liner and configured to supply combustion gas generated in the combustion chamber to a turbine; and an injection nozzle disposed in the nozzle casing to inject the fuel and the compressed air into the combustion chamber. The injection nozzle may include: an inlet portion through which the fuel and the compressed air are introduced; an outlet portion disposed downstream of the inlet portion in the flow direction of fluid and configured to discharge the fuel and compressed air to the combustion chamber; and an intermediate portion connected obliquely between the inlet portion and the outlet portion, wherein the inlet portion and the intermediate portion are symmetrically formed based on an imaginary center line extending from the outlet portion along the flow direction of fluid and passing through a center of the outlet portion.

According to an aspect of another exemplary embodiment, there is provided a gas turbine including: a compressor configured to intake and compress external air; a combustor configured to mix fuel with compressed air supplied from the compressor and combust the air-fuel mixture to produce combustion gas; and a turbine rotated by the combustion gas produced by the combustor to generate electric power. The combustor includes: a nozzle casing; a liner disposed downstream of the nozzle casing in a flow direction of fluid and defining a combustion chamber in which the air-fuel mixture is combusted; a transition piece disposed downstream of the liner and configured to supply the combustion gas to the turbine; and an injection nozzle disposed in the nozzle casing to inject the fuel and the compressed air into the combustion chamber. The injection nozzle includes: an inlet portion through which the fuel and the compressed air are introduced; an outlet portion disposed downstream of the inlet portion in the flow direction of fluid and configured to discharge the fuel and compressed air to the combustion chamber; and an intermediate portion connected obliquely between the inlet portion and the outlet portion, wherein the inlet portion and the intermediate portion are symmetrically formed based on an imaginary central line extending from the outlet portion along the flow direction of fluid and passing through a center of the outlet portion.

The inlet portion may include a pair of inlet portions symmetrically disposed with respect to the imaginary central line interposed therebetween, and the intermediate portion may include a pair of intermediate portions symmetrically disposed with respect to the imaginary central line interposed therebetween.

Each of the pair of inlet portions, the pair of intermediate portions, and the outlet portion may have a polygonal cross section along an imaginary plane perpendicular to the imaginary center line.

The pair of intermediate portions may be connected to each other at the respective downstream ends thereof, and the imaginary center line may pass through a portion at which the downstream ends of each intermediate portion are connected to each other.

When one of directions perpendicular to the flow direction of the fluid flowing through the outlet portion may be a first direction, and a direction opposite to the first direction may be a second direction, the pair of inlet portions are spaced apart from the center line in the first direction and the second direction, and the pair of intermediate portions are inclined from each of the inlet portions toward the center line such that the intermediate portions become closer to the center line toward downstream ends thereof.

Among walls of the pair of intermediate portions disposed inside and outside in the first and second directions, when two walls disposed closer to the center line are first intermediate walls and two walls disposed outside in the first and second directions are second intermediate walls, each of the intermediate portions may be formed such that a distance between the first intermediate wall and the second intermediate wall increases toward a downstream side.

When directions perpendicular to the flow direction of the fluid in the outlet portion and perpendicular to the first and second directions are third and fourth directions, respectively, each of the intermediate portions may be formed such that the distance between the first intermediate wall and the second intermediate wall increases toward the downstream side, and a width of the intermediate portion in the third and fourth directions may be constant or slightly decreases toward the downstream side.

An angle between the first intermediate wall and the center line may be greater than an angle between an extension line linearly extending from the second intermediate wall and the center line.

Among walls of the pair of intermediate portions disposed inside and outside in the first and second directions, when two walls disposed closer to the center line are first intermediate walls, and two walls disposed outside in the first and second directions are second intermediate walls, and among walls of the pair of inlet portions disposed inside and outside in the first and second directions, when two walls disposed closer to the center line are first inlet walls and two walls disposed outside in the first and second directions are second inlet walls, the first intermediate walls may be connected to the first inlet walls, respectively, at respective upstream ends thereof and are connected to each other at respective downstream ends thereof, and the second intermediate walls may be connected to the second inlet walls, respectively, at respective upstream ends thereof and are connected to the outlet portion at respective downstream ends thereof.

A connected portion of the first intermediate walls may be spaced apart from and disposed upstream of an upstream end of the outlet portion.

Portions in which the first intermediate walls and the first inlet walls are connected, portions in which the second intermediate walls and the second inlet walls are connected, and a portion in which the second intermediate walls and the outlet portion are connected may be formed to have a curved surface.

When directions perpendicular to the flow direction of the fluid in the outlet portion and perpendicular to the first and second directions are third and fourth directions, respectively, the connected portion of the first intermediate walls may include a plurality of connection grooves arranged in the third and fourth directions.

The connection grooves have a triangular shape, a rectangular shape, or a semi-circular shape when viewed along the first and second directions.

The inlet portion and the outlet portion may be formed in a cylindrical shape with the center line as a central axis, and the intermediate portion may be formed in a shape of a truncated cone with the center line as a central axis.

The inlet portion may include: a first inlet wall having a hollow cylinder shape; and a second inlet wall having a cylinder shape, disposed outside the first inlet wall in a radial direction, and surrounding the first inlet wall to provide a fluid channel between the first inlet wall and the second inlet wall. The intermediate portion may include: a first intermediate wall having an open lower end, connecting to the first inlet wall, and having a truncated cone shape with an apex portion facing the outlet portion; and a second intermediate wall surrounding the first intermediate wall in the radial direction, having an open lower end, and having a truncated cone shape, wherein the first and second intermediate walls are connected to the outlet portion.

A distance between the first intermediate wall and the second intermediate wall in the radial direction may increase toward a downstream side.

The downstream apex portion of the first intermediate wall may be spaced apart from and disposed upstream of an upstream end of the outlet portion.

A portion in which the first intermediate wall and the first inlet wall is connected, a portion in which the second intermediate wall and the second inlet wall is connected, and a portion in which the second intermediate wall and the outlet portion is connected may be formed to have a curved surface.

The injection nozzle, the combustor including the same nozzle, and the gas turbine including the same combustor according to one or more exemplary embodiments are formed such that the intermediate portion between the inlet portion and the outlet portion is disposed obliquely with respect to each of the inlet portion and the outlet portion. Therefore, the flame or radiant heat generated in the combustion chamber and introduced into the injection nozzle through the outlet portion of the injection nozzle can be reflected to the combustion chamber from the intermediate portion without reaching the inlet portion in which fuel and compressed air are mixed, thereby preventing autoignition or flashback that has occurred in combustors.

In addition, according to one or more exemplary embodiments, the inlet portion and the intermediate portion are symmetrically formed based on an imaginary center line C extending from the outlet portion along the flow direction of fluid and passing through a center of the outlet portion. Therefore, the flow velocity of the fluid at the exit of the nozzle can be adjusted.

Further, according to one or more exemplary embodiments, the inlet portion may include a pair of inlet portions symmetrically disposed with respect to the center line C, and the intermediate portion may include a pair of intermediate portions symmetrically disposed with respect to the center line C. In this case, a downstream end portion at which a pair of first intermediate walls are connected to each other may include a plurality of connection grooves arranged in the third and fourth directions D3 and D4. Therefore, the instability of fluid flow may be minimized at a point at which a fluid flow flowing between the first intermediate walls may collide with a fluid flow flowing between the second intermediate walls.

BRIEF DESCRIPTION OF THE DRAWINGS

The above and other aspects will become more apparent from the following description of the exemplary embodiments with reference to the accompanying drawings, in which:

FIG. 11 is a cross-sectional view of the injection nozzle illustrated in FIG. 9 according to a seventh exemplary embodiment and FIG. 12 is a top view of the injection nozzle illustrated in FIG. 3 according to an eighth exemplary embodiment.

DETAILED DESCRIPTION

Figure 1:
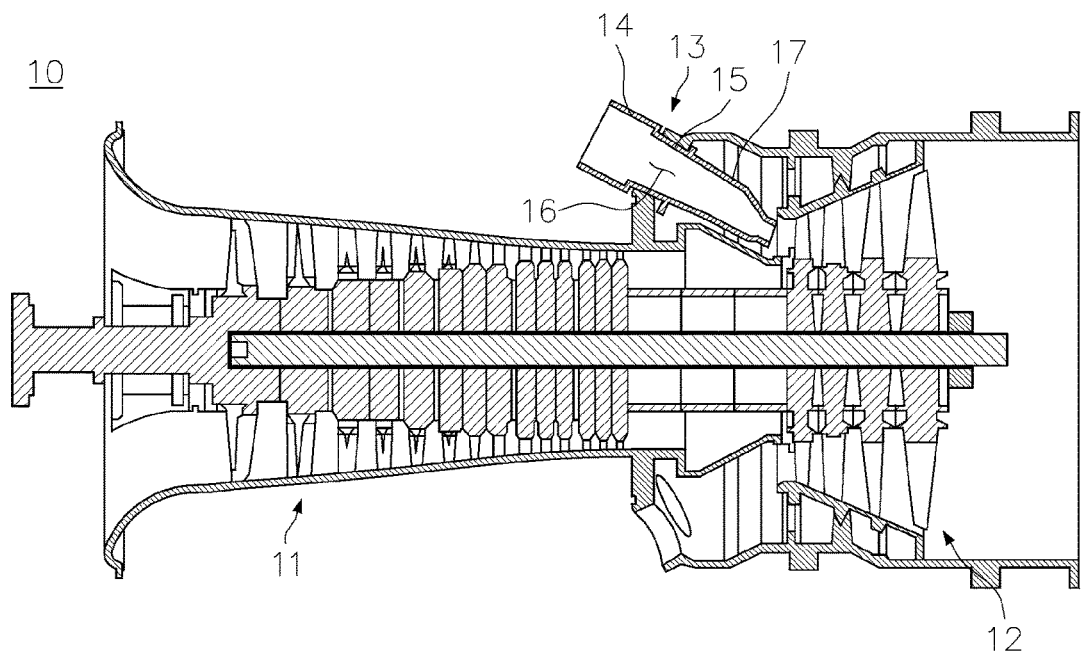
FIG. 1 is a cross-sectional view of a gas turbine according to an exemplary embodiment.

Various modifications and various embodiments will be described with reference to the accompanying drawings. However, it should be noted that the various embodiments are not for limiting the scope of the disclosure to the specific embodiment, but they should be interpreted to include all modifications, equivalents, or substitutions of the embodiments included within the spirit and scope disclosed herein.

Terms used herein are used to merely describe specific embodiments and are not intended to limit the scope of the disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

For clear illustration, components that are irrelevant to the description are omitted, and like reference numerals refer to like components throughout the specification. In certain embodiments, a detailed description of known functions and configurations that may obscure the gist of the present disclosure will be omitted. For the same reason, some of the elements in the drawings are exaggerated, omitted, or schematically illustrated.

Hereinafter, an injection nozzle, a combustor, and a gas turbine including the combustor according to an exemplary embodiment will be described with reference to the accompanying drawings.

FIG. 1 is a cross-sectional view of a gas turbine according to an exemplary embodiment. Referring to FIG. 1, a gas turbine 10 includes a compressor 11, a combustor 13, and a turbine 12. In a flow direction of gas (e.g., compressed air or combustion gas), the compressor 11 is disposed on an upstream side of the gas turbine 10 and the turbine 12 is disposed on a downstream side of the gas turbine 10. The combustor 13 is disposed between the compressor 11 and the turbine 12.

The compressor 11 includes compressor vanes and compressor rotors in a compressor casing. The turbine 12 includes turbine vanes and turbine rotors in a turbine casing. The compressor vanes and the compressor rotors are arranged in multiple stages along the flow direction of compressed air, and the turbine vanes and the turbine rotors are also arranged in multiple stages along the flow direction of combustion gas. The compressor 11 has an internal space of which a volume decreases from a front stage to a rear stage so that the introduced air can be compressed while passing through the inside of the compressor 11, whereas the turbine 12 has an internal space of which a volume increases from a front stage to a rear stage so that the combustion gas supplied from the combustor 13 can expand while passing through the inside of the turbine 13.

In addition, a torque tube serving as a torque transmission member is disposed between the last-stage compressor rotor of the compressor 11 and the first-stage turbine rotor of the turbine 12 to transfer the torque generated by the turbine 12 to the compressor 11. Although the torque tube may include a plurality of torque tube disks arranged in three stages as illustrated in FIG. 1, this is only an example, and the torque tube may include torque tube disks arranged in four or more stages or two or less stages.

The compressor rotor includes a compressor disk and a plurality of compressor blades. A plurality of compressor disks may be disposed in the compressor casing, and each of the compressor disks is fastened by a tie road so as not to be separated from each other in an axial direction. That is, the compressor disks are arranged in the axial direction with the tie rod extending through centers of the compressor disks. In addition, adjacent compressor disks are arranged such that opposing surfaces of the adjacent compressor disks are pressed against each other by the tie rod so that the compressor disks cannot rotate relative to each other.

The plurality of compressor blades are radially coupled to an outer surface of each of the compressor disks along a circumferential direction. For each compressor stage, the plurality of compressor vanes coupled to an inner surface of the compressor casing in the circumferential direction are alternately arranged with the plurality of compressor blades. While the compressor disks rotate along with a rotation of the tie rod, the compressor vanes fixed to the compressor casing do not rotate. The compressor vanes align the flow of compressed air passing through the compressor blades and guide the flow of the compressed air moved from front-stage compressor blades to rear-stage compressor blades. Here, the compressor casing and the compressor vanes may be collectively defined as a compressor stator to be distinguished from the compressor rotor.

The tie rod is installed to extend through the centers of the plurality of compressor disks and the plurality of turbine disks such that one end of the tie rod is fastened to the compressor disk located on the foremost end side of the compressor, and the other end thereof is fastened by a fixing nut.

Because the tie rod may be formed in various structures according to a type of a gas turbine, a shape of the tie rod is not limited to the example illustrated in FIG. 1. There are three types of tie rod including: a single-type in which a single tie rod extends through the centers of the compressor disks and the turbine rotor disks; a multi-type in which multiple tie rods are arranged in a circumferential direction; and a complex type in which the single-type and the multi-type are combined.

Also, the compressor may include a deswirler serving as a guide blade. The deswirler increases a pressure of fluid flowing into the combustor and adjusts a flow angle of the fluid to be substantially equal to a designed flow angle.

The combustor 13 mixes the introduced compressed air with fuel and burns the fuel-air mixture to produce high-temperature and high-pressure combustion gas with high energy, thereby raising the temperature of the combustion gas to a heat-resistant temperature at which components of the combustor and components of the turbine can endure through an isothermal combustion process.

Figure 2:
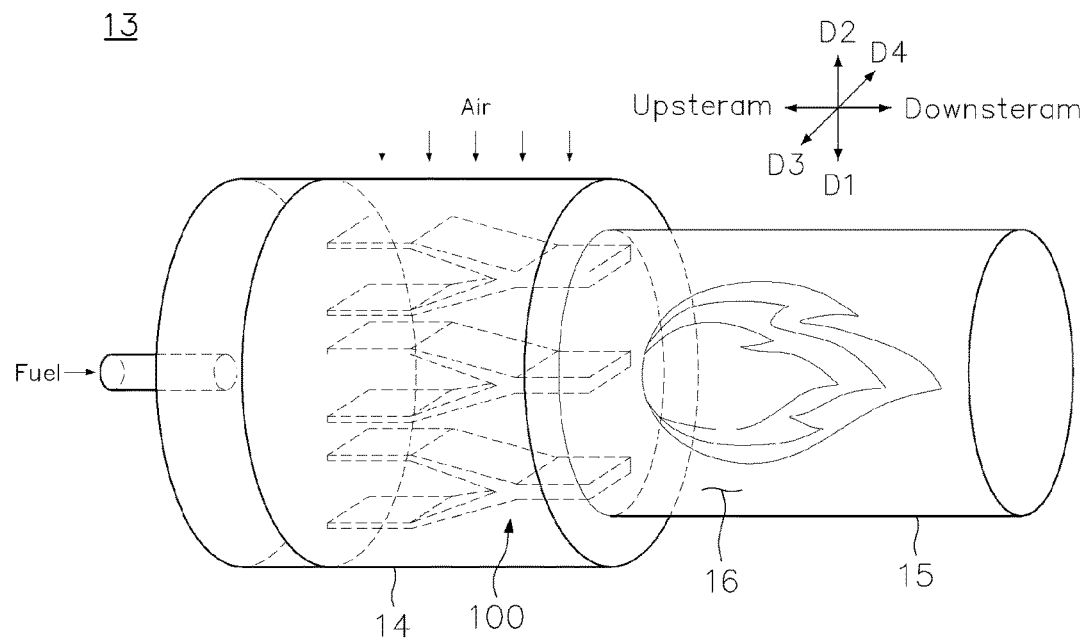
FIG. 2 is a perspective view of a combustor in the gas turbine of FIG. 1.

FIG. 2 is a perspective view of a combustor in the gas turbine of FIG. 1. Referring to FIG. 2, a plurality of combustors constituting the combustor 13 may be arranged in a form of a cell in a combustor casing. Each combustor 13 includes a nozzle casing 14, a plurality of injection nozzles 100 accommodated in the nozzle casing 14 to inject fuel, a liner 15 defining a combustion chamber 16, and a transition piece 17 connecting the combustor chamber 16 to the turbine 12.

The liner 15 provides a combustion space in which the fuel and compressed air injected from the injection nozzles 100 are mixed and burned. That is, the liner 15 includes the combustion chamber 16 having a combustion space in which the fuel-air mixture is combusted and an annular liner flow passage that surrounds the combustion chamber 16 to provide an annular space. The plurality of injection nozzles disposed inside the nozzle casing 14 mix the fuel supplied from the outside with the compressed air supplied from the compressor 11 and inject the fuel-air mixture into the combustion chamber 16. The injection nozzle 100 for injecting fuel is installed in front end of the liner 15, and an igniter is in a side wall of the liner 15. In addition, a nozzle plate may be installed between the nozzle casing 14 and the liner 15. The nozzle plate separates the combustion chamber 16 from the inner space of the nozzle casing 14, and is installed at the downstream end of the injection nozzle 100 in the fluid flow direction.

In the annular liner flow passage, compressed air introduced through a plurality of holes formed in an outer wall of the liner 15 flows, and the introduced compressed air cools the liner 15 while flowing toward the transition piece 17. Because the compressed air flows along the outer wall of the liner 15, it is possible to prevent the liner 15 from being thermally damaged by high temperature combustion gas.

The transition piece 17 is connected to the rear end (i.e., downstream end) of the liner 15 to deliver the combustion gas to the turbine. The transition piece 17 has an annular flow passage surrounding an inner space of the transition piece 17. Compressed air flows through the annular flow passage along the outer wall of the transition piece 17 to cool the outer wall of the transition piece 17, thereby preventing the transition piece 17 from being thermally damaged by high temperature combustion gas.

The high-temperature and high-pressure combustion gas supplied to the turbine 12 expands while passing through the inside of the turbine 12. The expansion of the combustion gas causes impulse and reaction forces with respect to the turbine blades, thereby generating torque. The torque is transferred to the compressor through the torque tube, and an excessive portion of the torque exceeding the driving force required to drive the compressor is used to drive a generator or the like.

The turbine 12 is similar in structure to the compressor 11. That is, the turbine 12 includes a plurality of turbine rotors similar to the compressor rotors of the compressor 11. Each turbine rotor includes a turbine rotor disk and a plurality of turbine blades radially coupled to an outer surface of the turbine rotor disk. The turbine disk and the plurality of turbine blades are designed in a structure in which they are arranged in a multi-stage to be spaced apart from each other along a flow direction of the combustion gas. A plurality of turbine vanes are radially coupled to the inner surface of the turbine casing along the circumferential direction such that each stage of turbine vanes is disposed between adjacent stages of turbine blades to guide a flow direction of the combustion gas passing through the turbine blades. Herein, the turbine casing and the turbine vanes may be collectively defined as a turbine stator to distinguish them from the turbine rotor.

Figure 3:
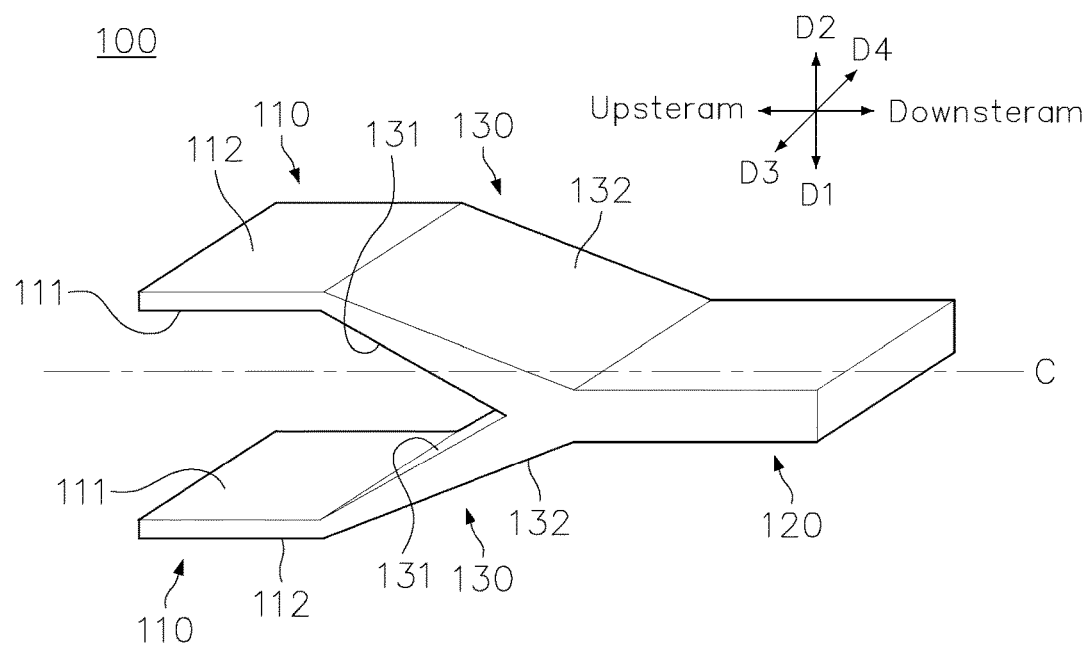
FIG. 3 is a perspective view illustrating an injection nozzle installed in the combustor of FIG. 2 according to a first exemplary embodiment.
Figure 4:
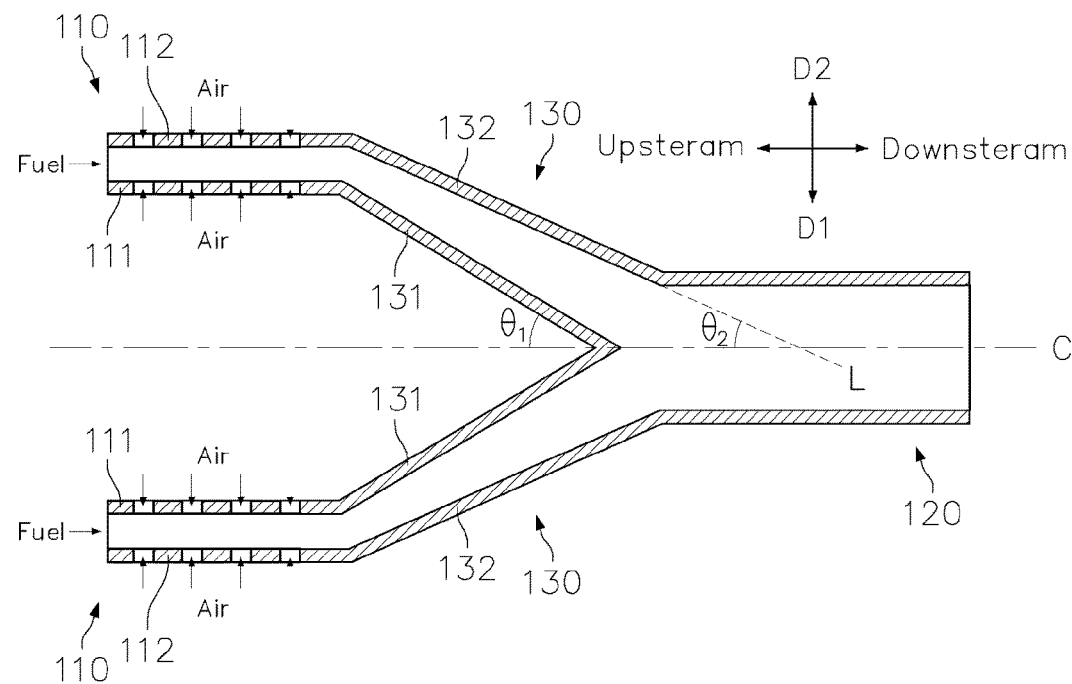
FIG. 4 is a cross-sectional view of the injection nozzle illustrated in FIG. 3.

FIG. 3 is a perspective view illustrating an injection nozzle installed in the combustor of FIG. 2 according to a first exemplary embodiment. FIG. 4 is a cross-sectional view of the injection nozzle illustrated in FIG. 3.

Referring to FIGS. 3 and 4, each of the injection nozzles 100 includes an inlet portion 110, an outlet portion 120, and an intermediate portion 130.

Fuel and compressed air are introduced into and mixed in the inlet portion 110. Fuel may be introduced through a main opening of the inlet portion 110, and compressed air may be introduced through a hole formed in a wall of the inlet portion 110. The output portion 120 is installed on a downstream side of the flow direction of fuel-air mixture flowing through the inlet portion 110, and injects the fuel-air mixture into the combustion chamber 16. The intermediate portion 130 is disposed between the inlet portion 110 and the outlet portion 120 and is connected to each of the inlet portion 110 and the outlet portion 120. The intermediate portion 130 is installed obliquely with respect to each of the inlet portion 110 and the outlet portion 120. A first set of the inlet portion 110 and the intermediate portion 130 connected to the outlet portion 120 and a second set of the inlet portion 110 and the intermediate portion 130 connected to the outlet portion 120 are symmetrically formed based on an imaginary center line C extending along the flow direction of the fluid and passing through the outlet portion 120.

Here, any one of a direction perpendicular to the flow direction of the fluid flowing through the outlet portion 120 is referred to as a first direction D1, and a direction opposite to the first direction D1 is referred to as a second direction D2. The directions perpendicular to the first and second directions D1 and D2 among the directions defining the inner width of the intermediate portion 130 are referred to as a third direction D3 and a fourth direction D4. That is, the third and fourth directions D3 and D4 are perpendicular to the flow direction of the fluid flowing through the outlet portion 120 and are perpendicular to the first and second directions D1 and D2. The third direction D3 and the fourth direction D4 are opposite to each other.

The injection nozzle 100 is configured as a pair and includes two inlet portions 110 symmetrically disposed with respect to the center line C interposed therebetween. In addition, two intermediate portions 130 are provided as a pair at one outlet portion 120 and are disposed symmetrically with respect to the center line C interposed therebetween. In this case, each of the pair of inlet portions 110, the pair of intermediate portions 130, and the outlet portion 120 have a polygonal cross-sectional shape along an imaginary plane perpendicular to the center line C. Although FIG. 3 illustrates that each of the pair of inlet portions 110, the pair of intermediate portions 130, and the outlet portion 120 has a rectangular cross-sectional shape, it is only an example. Alternatively, the pair of inlet portions 110, the pair of intermediate portions 130, and the outlet portion 120 may have polygonal cross sections having different shapes.

A pair of intermediate portions 130 are connected to each other at the respective downstream ends thereof, and the center line C passes through the downstream ends of each intermediate portion 130. In addition, the pair of inlet portions 110 are spaced apart from the center line C in a first direction D1 and a second direction D2, and each of the pair of intermediate portions 130 is installed obliquely such that a distance to the center line C decreases toward the downstream end.

For example, among walls of the intermediate portions 130 disposed inside and outside in the first direction D1 and the second direction D2, the walls disposed closer to the center line C and disposed inside in the first and second directions D1 and D2 are referred to as first intermediate walls 131 and the walls disposed outside in the first and second directions D1 and D2 are referred to as second intermediate walls 132. In addition, among walls of the inlet portions 110 disposed inside and outside in the first and second directions D1 and D2, the walls disposed closer to the center line and disposed inside are referred to as first inlet walls 111 and the walls disposed outside are referred to as second inlet walls 112. In this case, the first intermediate walls 131 are connected to each of the first inlet walls 111 at each upstream end thereof and are connected to each other at each downstream end thereof, and the second intermediate walls 132 are connected to each of the second inlet walls 112 at each upstream end thereof and are connected to the outlet portion 120 at each downstream end thereof. Here, the connected portion of the first intermediate walls 131 may be disposed upstream of the upstream end of the outlet portion 120.

The intermediate portions 130 may be formed in a shape in which a distance between the first intermediate wall 131 and the second intermediate wall 132 increases toward the downstream side. For example, the intermediate portions 130 are shaped such that the distance between the first intermediate wall 131 and the second intermediate wall 132 increases toward the downstream side, but a width of the intermediate portions 130 in the third and fourth directions D3 and D4 is constant (see FIG. 3) or slightly decreases (see FIG. 12) toward the downstream side. An angle $\theta_1$ between the first intermediate wall 131 and the center line C may be greater than an angle $\theta_2$ between an extension line L linearly extending from the second intermediate wall 132 and the center line C.

If the intermediate portions 130 are designed to have the shape described above, radiant heat generated in the combustion chamber 16 and propagated toward the injection nozzle 100 returns to the combustion chamber 16 due to continuous reflection from the first intermediate walls 131 when reaching the intermediate portions 130. Therefore, according to the exemplary embodiment, it is possible to prevent the transfer of the radiant heat to the inlet portions 110 in which fuel and compressed air are mixed, thereby preventing an autoignition or flashback phenomenon in the combustor 13.

In addition, by adjusting the distance between the inner walls 111 of the inlet portions 110 and the width of the inner space of the outlet portion 120, it is possible to optimally set the flow rate of the fuel-air mixture injected into the combustion chamber 16 from the outlet portion 120 of the injection nozzle.

Figure 5:
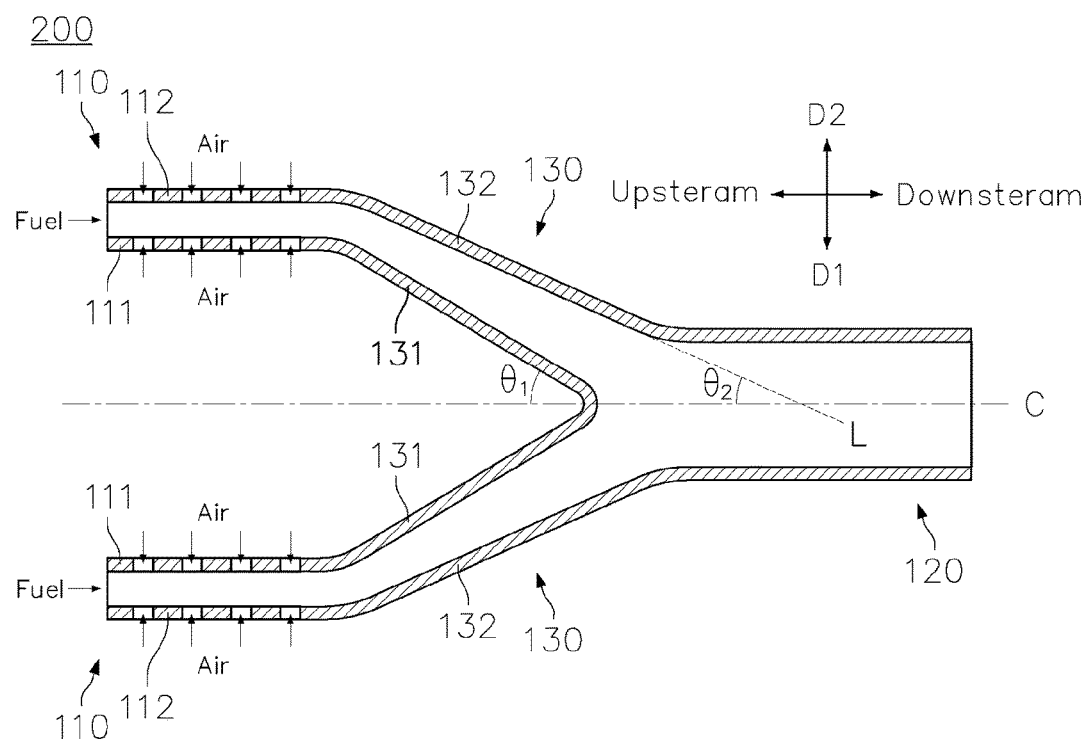
FIG. 5 is a cross-sectional view illustrating the injection nozzle installed in FIG. 4 according to a second exemplary embodiment.
Figure 6:
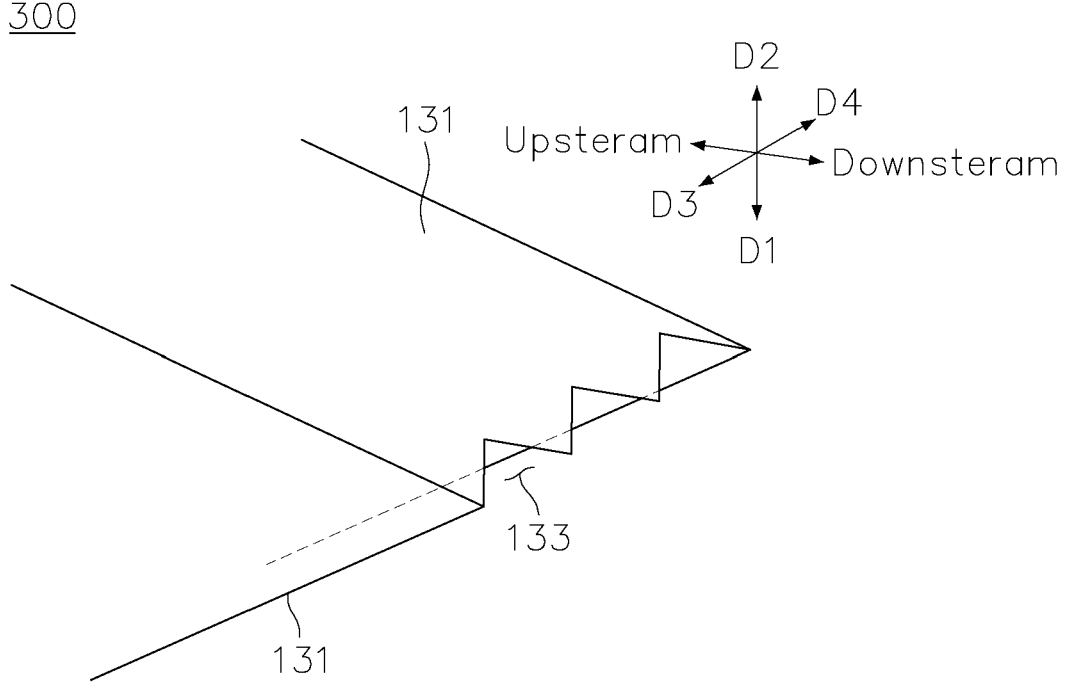
FIG. 6 is an enlarged perspective view illustrating the injection nozzle installed in the combustor of FIG. 2 according to a third exemplary embodiment.
Figure 7:
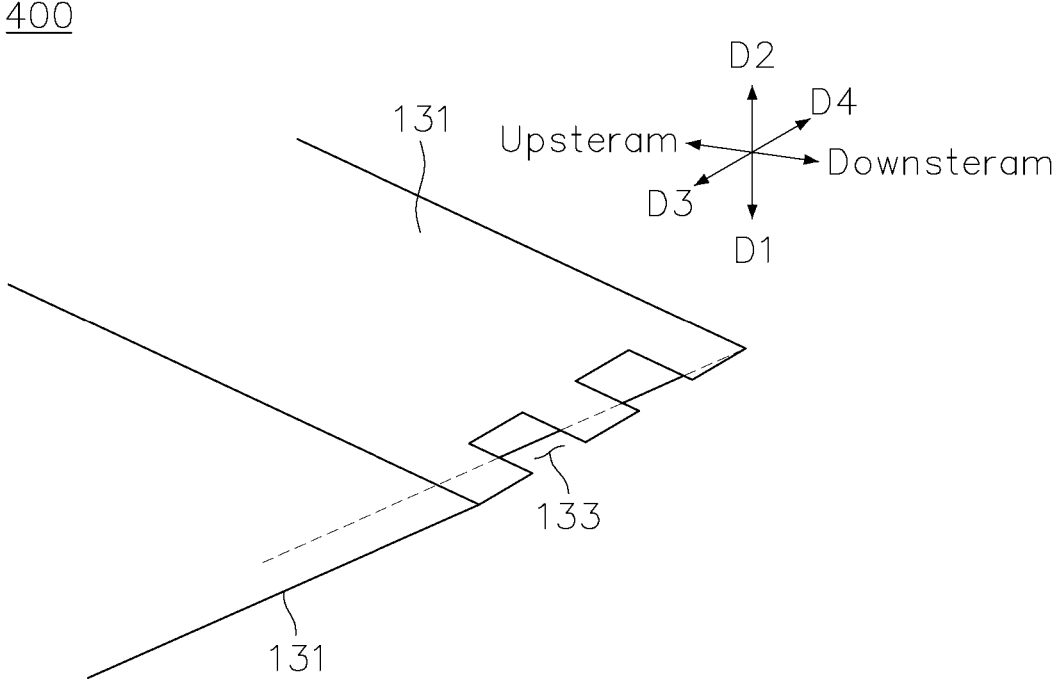
FIG. 7 is an enlarged perspective view illustrating the injection nozzle installed in the combustor of FIG. 2 according to a fourth exemplary embodiment.
Figure 8:
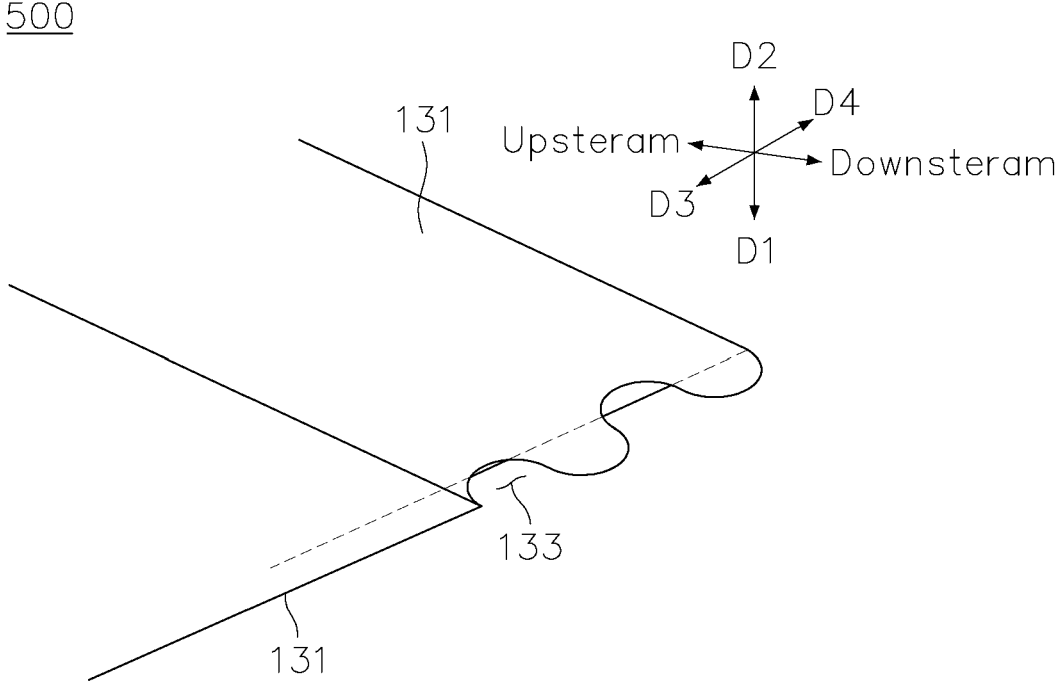
FIG. 8 is an enlarged perspective view illustrating the injection nozzle installed in the combustor of FIG. 2 according to a fifth exemplary embodiment.

FIG. 5 is a cross-sectional view illustrating the injection nozzle installed in FIG. 4 according to a second exemplary embodiment. FIG. 6 is an enlarged perspective view illustrating the injection nozzle installed in the combustor of FIG. 2 according to a third exemplary embodiment. FIG. 7 is an enlarged perspective view illustrating the injection nozzle installed in the combustor of FIG. 2 according to a fourth exemplary embodiment. FIG. 8 is an enlarged perspective view illustrating the injection nozzle installed in the combustor of FIG. 2 according to a fifth exemplary embodiment.

Referring to FIG. 5, in an injection nozzle 200 according to a second exemplary embodiment, a portion in which a first intermediate wall 131 of the pair of intermediate portions 130 and a first inlet wall 111 of the pair of inlet portions 110 are connected may be curved. In addition, a portion in which a second intermediate wall 132 of the pair of intermediate portions 130 and a second inlet wall 112 of the pair of inlet portions 110 are connected may be curved. Further, a portion in which the second intermediate wall 132 of the pair of intermediate portions 130 and the outlet portion 120 are connected may be curved. In addition, a portion in which the pair of first intermediate walls 131 are connected to each other may also be curved.

If the injection nozzle is designed as in the second exemplary embodiment, it is possible to avoid reducing the flow rate or unstable flow of the fuel-air mixture when the fuel-air mixture flows through the pair of inlet portions 110, the pair of intermediate portions 130, and the outlet portion 120 of the injection nozzle 200.

Referring to FIGS. 6 to 8, in injection nozzles 300, 400, and 500, a portion in which the pair of first intermediate walls 131 are connected to each other includes a plurality of connection grooves 133 arranged in third and fourth directions D3 and D4. Here, each of the connection grooves 133 may have a triangle shape, a rectangular shape, and a semi-circular shape when viewed along the first and second directions D1 and D2. Although FIGS. 6 to 8 illustrate that the plurality of connection grooves 133 have the same shape of a triangle shape, a rectangular shape, and a semi-circular shape, those are only examples. Alternatively, each of the plurality of connection grooves 133 may have different shapes. For example, some of the plurality of connection grooves 133 may have a triangular shape, some may have a rectangular shape, and others may have a semi-circular shape. Alternatively, the connection grooves 133 may be formed in a shape other than a triangle, a square, or a semicircle.

The fluid flowing into one of a pair of intermediate portions 130 and the fluid flowing into the other of the pair of intermediate portions 130 join each other at the downstream ends of the pair of first intermediate walls 131. In this case, the flow of the fluid may collide with each other, and the flow of the combined fluid may become unstable.

However, according to the third to fifth exemplary embodiments, at the point in which two different flows join each other (i.e., the downstream side in which the first intermediate walls 131 are connected to each other), the first intermediate walls 131 include the plurality of connection grooves 133. Therefore, it is possible to suppress the unstable flow of the fluid at the point in which the flows of the fluid join each other.

Figure 9:
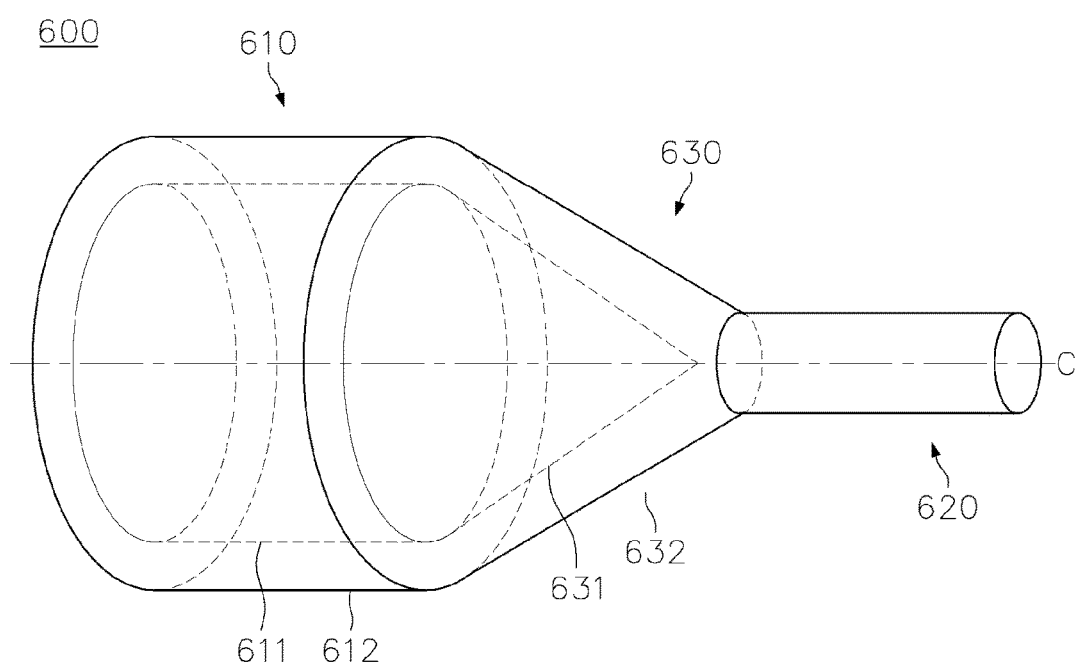
FIG. 9 is a perspective view illustrating an injection nozzle according to a sixth exemplary embodiment.
Figure 10:
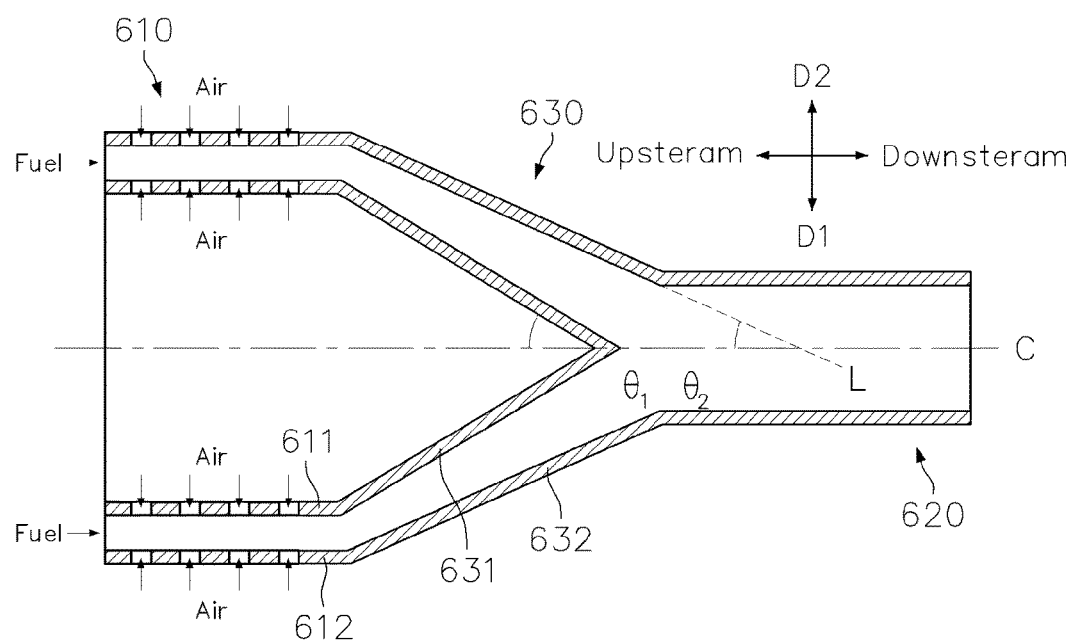
FIG. 10 is a cross-sectional view of the injection nozzle illustrated in FIG. 9.
Figure 11:
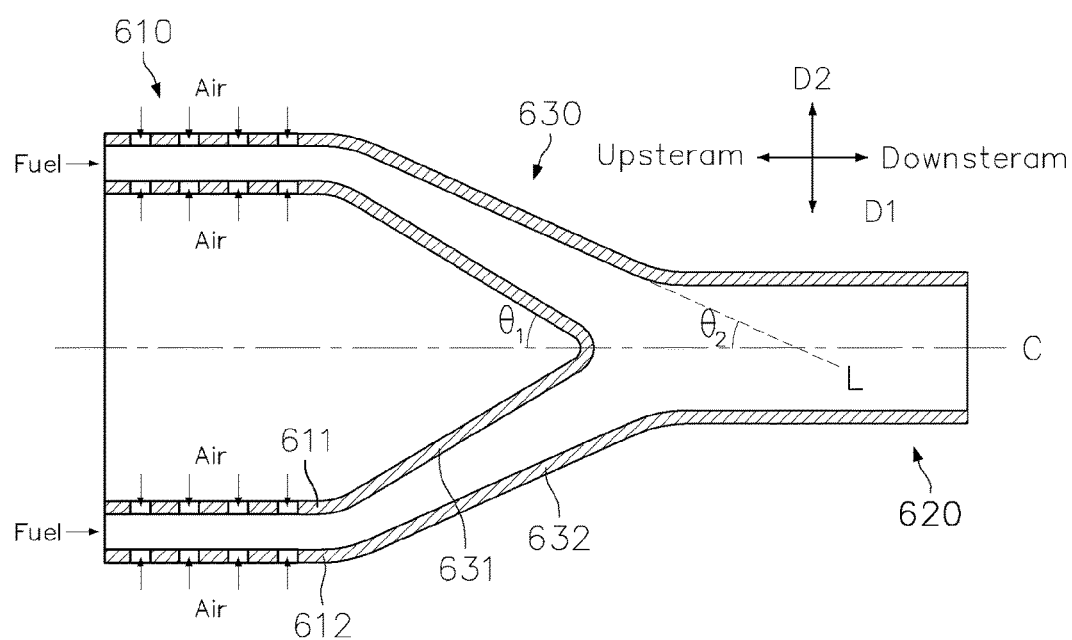

FIG. 9 is a perspective view illustrating an injection nozzle according to a sixth exemplary embodiment. FIG. 10 is a cross-sectional view of the injection nozzle illustrated in FIG. 9. FIG. 11 is a cross-sectional view of the injection nozzle illustrated in FIG. 9 according to a seventh exemplary embodiment.

Referring to FIGS. 9 and 10, the injection nozzle 600 includes an inlet portion 610, an outlet portion 620, and an intermediate portion 630.

Fuel and compressed air are introduced into and mixed in the inlet portion 610. Fuel may be introduced through a main opening of the inlet portion 610, and compressed air may be introduced through a hole formed in a wall of the inlet portion 610. The output portion 620 is installed on a downstream side of the flow direction of fuel-air mixture flowing through the inlet portion 610, and injects the fuel-air mixture into the combustion chamber 16. The intermediate portion 630 is disposed between the inlet portion 610 and the outlet portion 620 and is connected to each of the inlet portion 610 and the outlet portion 620. The intermediate portion 130 is installed obliquely with respect to each of the inlet portion 610 and the outlet portion 620. The inlet portion 610 and the intermediate portion 630 connected to the outlet portion 620 are symmetrically formed based on an imaginary central line C extending along the flow direction of the fluid and passing through the outlet portion 620.

The inlet portion 610 is formed in a cylindrical shape with the imaginary central line C as a central axis. The outlet portion 620 is also formed in a cylindrical shape with the imaginary central line C as a central axis. The intermediate portion 630 is formed in a truncated cone shape with the imaginary central line C as a central axis.

The inlet portion 610 includes a first inlet wall 611 having a hollow cylindrical shape and a second cylindrical inlet wall 612 disposed outside the first inlet wall 611 in a radial direction and configured to surround the first inlet wall 611, thereby allowing a fluid to flow between the first inlet wall 611 and the second inlet wall 612. The intermediate portion 630 includes a first intermediate wall 631 having a truncated cone shape with an open lower end and a second intermediate wall 632 having a truncated cone shape with an open lower end and surrounding the first intermediate wall 631 and disposed outside the first intermediate wall 631 in the radial direction. The lower ends of the first and second intermediate walls 631 and 632 are connected to the first inlet wall 611 and the second inlet wall 612, respectively.

Here, a distance between the first intermediate wall 631 and the second intermediate wall 632 in the radial direction increases toward the downstream side. The downstream end of the first intermediate wall 631 is spaced apart from the upstream end of the outlet portion 620. For example, the downstream end of the first intermediate wall 631 is disposed upstream of the upstream end of the outlet portion 620.

If the intermediate portion 630 is designed to have the shape described above, radiant heat generated in the combustion chamber 16 and propagated toward the injection nozzle 600 returns to the combustion chamber 16 due to continuous reflection from the first intermediate wall 631 when reaching the intermediate portion 630. Therefore, according to the exemplary embodiment, it is possible to prevent the transfer of the radiant heat to the inlet portion 610 in which fuel and compressed air are mixed, thereby preventing an autoignition or flashback phenomenon in the combustor 13.

Referring to FIG. 11, in the injection nozzle 700, a portion in which the first intermediate wall 631 and the first inlet wall 611 are connected to each other may be curved. In addition, a portion in which the second intermediate wall 632 and the second inlet wall 612 are connected to each other may be curved. Further, a portion in which the second intermediate wall 632 and the outlet portion 620 are connected to each other may be curved. A vertex portion of the first intermediate wall 631 may also have a curved surface.

If the injection nozzle is designed as in the seventh exemplary embodiment, it is possible to avoid reducing the flow rate or unstable flow of the fuel-air mixture when the fuel-air mixture flows through the inlet portion 610, the intermediate portion 630, and the outlet portion 620 of the injection nozzle 700.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. An injection nozzle for injecting fuel and compressed air into a combustion chamber of a combustor of a gas turbine, the injection nozzle comprising:
   an inlet portion through which the fuel and the compressed air are introduced;
   an outlet portion disposed downstream of the inlet portion in a flow direction of fluid and configured to discharge the fuel and compressed air to the combustion chamber;

an intermediate portion connected obliquely to each of the inlet portion and the outlet portion: and an imaginary center line extending from the outlet portion along the flow direction of fluid and passing through a center of the outlet portion, wherein the inlet portion comprises a pair of inlet portions, each being shaped as a first rectangular hollow; the outlet is shaped as a second rectangular hollow; and each of the pair of inlet portions and the outlet portion are substantially parallel to each other, wherein the fuel enters into each of the pair of inlet portions through an upstream end of each of the pair of inlet portions; and the compressed air enters into each of the pair of inlet portions through a plurality of air holes located on walls of each of the pair of inlet portions, wherein the walls, which have opposing sides, include at least two air holes from the plurality of air holes, with one air hole present on each side of the opposing sides; and the plurality of air holes is disposed downstream of the upstream end of each of the pair of inlet portions, wherein one direction perpendicular to the center line is a first direction, a direction opposite to the first direction is a second direction, and directions perpendicular to the center line and perpendicular to the first and second directions are third and fourth directions, respectively, wherein the pair of inlet portions is symmetrically disposed with respect to the center line interposed therebetween while being spaced apart from the center line in the first direction and the second direction, wherein the intermediate portion includes a pair of intermediate portions symmetrically disposed with respect to the center line interposed therebetween, wherein the pair of intermediate portions are inclined from each of the pair of inlet portions toward the center line, converging closer to the center line toward downstream ends of the pair of intermediate portions, wherein among walls of the pair of intermediate portions disposed inside and outside in the first and second directions, two walls disposed closer to the center line are first intermediate walls and two walls disposed outside in the first and second directions are second intermediate walls, and each of the pair of intermediate portions is formed such that a distance between the first intermediate wall and the second intermediate wall increases toward a downstream side and a width of each of the pair of intermediate portions in the third and fourth directions is constant or slightly decreases toward the downstream side.

2. The injection nozzle according to claim 1, wherein each of the pair of intermediate portions has a polygonal cross section along an imaginary plane perpendicular to the imaginary center line.

3. The injection nozzle according to claim 1, wherein the pair of intermediate portions are connected to each other at the respective downstream ends thereof, and the imaginary center line passes through a portion at which the downstream ends of each intermediate portion are connected to each other.

4. The injection nozzle according to claim 1, wherein an angle between the first intermediate wall of each intermediate portion and the center line is greater than an angle between an extension line linearly extending from the second intermediate wall of each intermediate portion, and the center line.

5. The injection nozzle according to claim 1, wherein among the walls of each of the pair of inlet portions disposed inside and outside in the first and second directions, when two walls disposed closer to the center line are first inlet walls and two walls disposed outside in the first and second directions are second inlet walls, the first intermediate walls are connected to the first inlet walls, respectively, at respective upstream ends thereof and are connected to each other at respective downstream ends of the first intermediate walls, and the second intermediate walls are connected to the second inlet walls, respectively, at respective upstream ends thereof and are connected to the outlet portion at respective downstream ends of the second intermediate walls.

6. The injection nozzle according to claim 5, wherein a connected portion of the first intermediate walls is spaced apart from and disposed upstream of an upstream end of the outlet portion.

7. The injection nozzle according to claim 5, wherein portions in which the first intermediate walls and the first inlet walls are connected, portions in which the second intermediate walls and the second inlet walls are connected, and a portion in which the second intermediate walls and the outlet portion are connected are formed to have a curved surface.

8. The injection nozzle according to claim 5, wherein the connected portion of the first intermediate walls includes a plurality of connection grooves arranged in the third and fourth directions.

9. The injection nozzle according to claim 8, wherein the connection grooves have a triangular shape, a rectangular shape, or a semi-circular shape when viewed along the first and second directions.

10. A combustor comprising:
a nozzle casing configured to receive compressed air from a compressor and to receive fuel from an outside;
a liner disposed downstream of the nozzle casing in a flow direction of fluid and defining a combustion chamber in which a mixture of the fuel and the compressed air is combusted;
a transition piece disposed downstream of the liner and configured to supply combustion gas generated in the combustion chamber to a turbine; and
an injection nozzle disposed in the nozzle casing to inject the fuel and the compressed air into the combustion chamber,
wherein the injection nozzle comprises:
an inlet portion through which the fuel and the compressed air are introduced;
an outlet portion disposed downstream of the inlet portion in the flow direction of fluid and configured to discharge the fuel and compressed air to the combustion chamber;
an intermediate portion connected obliquely between the inlet portion and the outlet portion; and
an imaginary center line extending from the outlet portion along the flow direction of fluid and passing through a center of the outlet portion,
wherein the inlet portion comprises a pair of inlet portions, each being shaped as a first rectangular hollow; the outlet portion is shaped as a second rectangular hollow; and each of the pair of inlet portions and the outlet portion are substantially parallel to each other,
wherein the fuel enters into each of the pair of inlet portions through an upstream end of each of the pair of inlet portions; and the compressed air enters into each of the pair of inlet portions through a plurality of air holes located on walls of each of the pair of inlet portions, wherein the walls, which have opposing sides, include at least two air holes from the plurality of air holes, with one air hole present on each side of the opposing sides; and the plurality of air holes is disposed downstream of the upstream end of each of the pair of inlet portions, wherein one direction perpendicular to the center line is a first direction, a direction opposite to the first direction is a second direction, and directions perpendicular to the center line and perpendicular to the first and second directions are third and fourth directions, respectively, wherein the pair of inlet portions is symmetrically disposed with respect to the center line interposed therebetween while being spaced apart from the center line in the first direction and the second direction, wherein the intermediate portion includes a pair of intermediate portions symmetrically disposed with respect to the center line interposed therebetween, wherein the pair of intermediate portions are inclined from each of the inlet portions toward the center line, converging closer to the center line toward downstream ends of the pair of intermediate portions, wherein among walls of the pair of intermediate portions disposed inside and outside in the first and second directions, two walls disposed closer to the center line are first intermediate walls and two walls disposed outside in the first and second directions are second intermediate walls, and each of the pair of intermediate portions is formed such that a distance between the first intermediate wall and the second intermediate wall increases toward a downstream side and a width of each of the pair of intermediate portions in the third and fourth directions is constant or slightly decreases toward the downstream side.

11. A gas turbine comprising:
a compressor configured to intake and compress external air;
a combustor configured to mix fuel with compressed air supplied from the compressor and combust the air-fuel mixture to produce combustion gas; and
a turbine rotated by the combustion gas produced by the combustor to generate electric power, wherein the combustor comprises:
a nozzle casing;
a liner disposed downstream of the nozzle casing in a flow direction of fluid and defining a combustion chamber in which the air-fuel mixture is combusted,
a transition piece disposed downstream of the liner and configured to supply the combustion gas to the turbine; and
an injection nozzle disposed in the nozzle casing to inject the fuel and the compressed air into the combustion chamber, wherein the injection nozzle comprises:
an inlet portion through which the fuel and the compressed air are introduced;
an outlet portion disposed downstream of the inlet portion in the flow direction of fluid and configured to discharge the fuel and compressed air to the combustion chamber;
an intermediate portion connected obliquely between the inlet portion and the outlet portion; and
an imaginary center line extending from the outlet portion along the flow direction of fluid and passing through a center of the outlet portion, wherein the inlet portion comprises a pair of inlet portions, each being shaped as a first rectangular hollow; the outlet portion, being shaped as a second rectangular hollow; and each of the pair of inlet portions and the outlet portion are substantially parallel to each other, wherein the fuel enters into each of the pair of inlet portions through an upstream end of each of the pair of inlet portions; and the compressed air enters into each of the pair of inlet portions through a plurality of air holes located on walls of each of the pair of inlet portions, wherein the walls, which have opposing sides, include at least two air holes from the plurality of air holes, with one air hole present on each side of the opposing sides; and the plurality of air holes is disposed downstream of the upstream end of each of the pair of inlet portions, wherein one direction perpendicular to the center line is a first direction, a direction opposite to the first direction is a second direction, and directions perpendicular to the center line and perpendicular to the first and second directions are third and fourth directions, respectively, wherein the pair of inlet portions is symmetrically disposed with respect to the center line interposed therebetween while being spaced apart from the center line in the first direction and the second direction, wherein the intermediate portion includes a pair of intermediate portions symmetrically disposed with respect to the center line interposed therebetween, wherein the pair of intermediate portions are inclined from each of the inlet portions toward the center line, converging closer to the center line toward downstream ends of the pair of intermediate portions, wherein among walls of the pair of intermediate portions disposed inside and outside in the first and second directions, two walls disposed closer to the center line are first intermediate walls and two walls disposed outside in the first and second directions are second intermediate walls, and each of the pair of intermediate portions is formed such that a distance between the first intermediate wall and the second intermediate wall increases toward a downstream side and a width of each of the pair of intermediate portions in the third and fourth directions is constant or slightly decreases toward the downstream side.

\* \* \* \* \*